(12) United States Patent
Chang et al.

(10) Patent No.: US 7,836,066 B2
(45) Date of Patent: Nov. 16, 2010

(54) USING SQL EXTENSIBILITY FOR PROCESSING DYNAMICALLY TYPED XML DATA IN XQUERY QUERIES

(75) Inventors: Hui Joe Chang, Fremont, CA (US); Zhen Hua Liu, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 369 days.

(21) Appl. No.: 11/777,132

(22) Filed: Jul. 12, 2007

(65) Prior Publication Data

US 2009/0018989 A1    Jan. 15, 2009

(51) Int. Cl.
    G06F 17/30    (2006.01)
(52) U.S. Cl. ............................................ 707/760; 26/3
(58) Field of Classification Search ........................ None
    See application file for complete search history.

(56) References Cited

U.S. PATENT DOCUMENTS

| | | |
|---|---|---|
| 6,282,537 B1 | 8/2001 | Madnick et al. |
| 6,636,845 B2 | 10/2003 | Chau et al. |
| 6,836,778 B2 | 12/2004 | Manikutty et al. |
| 6,934,712 B2 | 8/2005 | Kiernan et al. |
| 7,171,404 B2 | 1/2007 | Lindblad et al. |
| 7,346,609 B2 | 3/2008 | Chen et al. |
| 7,472,108 B2 | 12/2008 | Lim et al. |
| 7,693,812 B2 | 4/2010 | Lim et al. |
| 2003/0028561 A1 | 2/2003 | Gounares et al. |
| 2003/0140308 A1 | 7/2003 | Murthy et al. |
| 2003/0200214 A1 | 10/2003 | Doole et al. |
| 2004/0015783 A1 | 1/2004 | Lennon et al. |
| 2004/0064466 A1 | 4/2004 | Manikutty et al. |
| 2004/0205082 A1 | 10/2004 | Fontoura et al. |
| 2005/0097084 A1 | 5/2005 | Balmin et al. |
| 2005/0289125 A1* | 12/2005 | Liu et al. ........................ 707/3 |
| 2006/0010124 A1 | 1/2006 | Lucas et al. |
| 2007/0038649 A1 | 2/2007 | Agrawal et al. |
| 2008/0215542 A1 | 9/2008 | Lim et al. |

OTHER PUBLICATIONS

Leontiev et al., ACM computing surveys, vol. 34, No. 4, Dec. 2002, pp. 409-449.*
Oracle, "Oracle 9i XML Database Developer's Guide", Oracle XML DB, Release 2 (9.2), Mar. 2002, 902 pages.
Votsch et al., "Oracle XML DB: Uniting XML Content and Data", Seybold Consulting Group, 2002, 14 pages.

(Continued)

*Primary Examiner*—Apu M Mofiz
*Assistant Examiner*—Anteneh Girma
(74) *Attorney, Agent, or Firm*—Hickman Palermo Truong & Becker LLP (57) ABSTRACT

XQuery queries that include functions that operate on dynamically typed XML data are rewritten into compilable SQL constructs. XML data that is dynamically typed is XML data for which a specific XML data type cannot be determined at compile time and in fact may vary. In general, XQuery queries are rewritten into SQL queries that use SQL constructs in lieu of XQuery constructs. The SQL constructs include an "SQL polymorphic function" that is defined or recognized by a database system as valid syntax for an SQL query. The rewritten query applies the XML data to the SQL polymorphic function, but the XML data has been typed as XMLType, a data type recognized by SQL standards.

16 Claims, 5 Drawing Sheets

```
XMLTypeSum() user defined aggregation function

Init function:   initialize aggregateSumState S

Iterate function(x):
    If (S->firstvalue)
    {
        S->firstvalue = false;
        If (x is not atomic type)
            Raise error
        Copy x type and value into S->rsltType, S->rsltValue;
    }
    else
    {
        if (x type is addable to S->rsltType)
            S->rsltValue += getAtomicValue(x)
        Else
            Raise error
    }

Terminate function: return new XMLType(S->rsltValue, S->rsltType)
```

OTHER PUBLICATIONS

Krishnaprasad et al., Proceedings of the 30$^{th}$ VLDB Conference, Toronto Canada, 2004, 11 pages.

Du, F., "Moving from XML Documents to XML Databases", Thesis, University of British Columbia, Mar. 2004, 42 pages.

Melton, J., "SQLX Bringing XML and SQL Together", JISBD2001, Jornada de Ingeneria del Software y Bases de Datos, Almagro, Espana, 2001, 156 pages.

European Patent Office, "Communication Pursuant to Article 94(3) EPC", Application No. 05 760 442.3-2201, dated Jun. 20, 2008, 2 pages.

Claims, Application No. 05 760 442.3-2201, 8 pages.

Salminen, Ari et al., "Requirements for XML Document Database Systems" Dept. of Computer Science and Information Systems, University of Jwaskya, 2001, pp. 85-94.

Bohannon, Philip et al., From XML Schema to Relations: A Cost-Based Approach to XML Storage, Bell Laboratories, Proc of the 18$^{th}$ International Conference on Data Engineering, IEEE, 2002, pp. 1-28.

Choi, Byron et al., "The XQuey Formal Semantics: A Foundation for Implementation Optimization," May 31, 2002, IEEE XP-002353605, 15 pages.

"Type polymorphism" downloaded from the Internet on May 31, 2007 <http://en.wikipedia.org/wiki/Polymorphism (computer science)> 6 pages.

* cited by examiner

XMLTypeSum() user defined aggregation function

Init function:    initialize aggregateSumState S

Iterate function(x):
    If (S->firstvalue)
    {
      S->firstvalue = false;
      If (x is not atomic type)
        Raise error
      Copy x type and value into S->rsltType, S->rsltValue;
    }
    else
    {
      if (x type is addable to S->rsltType)
        S->rsltValue += getAtomicValue(x)
      Else
        Raise error
    }

Terminate function: return new XMLType(S->rsltValue, S->rsltType)

FIG. 3

XMLTypeAvg() user defined aggregation function

Init function:   initialize aggregateAvgState S

Iterate function (x):
   If (S->firstvalue)
   {
     S->firstvalue = false;
     If (x is not atomic type)
       Raise error
     Copy x type and value into S->rsltType, S->rsltValue;
   }
   else
   {
     if (x type is addable to S->rsltType)
       S->rsltValue += getAtomicValue(x)
       S->cnt++;
     Else
       Raise error
   }

Terminate function: S->rsltValue = S->rsltValue div S->cnt;
                   return new XMLType(S->rsltValue, S->rsltType)

FIG 4.

```
Int XMLTComp(x, y)
{
    if (x is not atomic value or y is not atomic value) raise error;
    t1 = getAtomicType(x);
    t2 = getAtomicType(y);
    if (t1 && t2 are decimal type)
        return sql_compare_decimalType(getAtomicValue(x), getAtomicValue(y));
    else if (t1 is decimal type && t2 is float type)
        return sql_compare_floatType(convertToFloat(getAtomicValue(x), getAtomicValue(y)));
    else if (t1 is decimal type && t2 is double type)
        return sql_compare_doubleType(convertToDouble(getAtomicValue(x), getAtomicValue(y)));
    else if (t1 is float type && t2 is double type)
return sql_compare_doubleType(convertToDouble(getAtomicValue(x), getAtomicValue(y)));
    else if (t1 is float type && t2 is decimal type)
        return sql_compare_floatType( getAtomicValue(x), convertToFloat (getAtomicValue(y)));
    else if (t1 is double type && t2 is decimal type)
        return sql_compare_doubleType( getAtomicValue(x), convertToDouble
(getAtomicValue(y)));
    else if (t1 is double type && t2 is float type)
        return sql_compare_doubleType(getAtomicValue(x),
convertToDouble(getAtomicValue(y)));
    else if (t1 is date type && t2 is date type)
        return sql_compare_dateType(getAtomicValue(x), getAtomicValue(y));
    else if (t1 is time type && t2 is time type)
        return sql_compare_timeType(getAtomicValue(x), getAtomicValue(y));
    else if (t1 is dateTime type && t2 is dateTime type)
        return sql_compare_dateTimeType(getAtomicValue(x), getAtomicValue(y));
    else if (t1 is dayTimeDuration type && t2 is dayTimeDuration type)
        return sql_compare_dayTimeDurationType(getAtomicValue(x), getAtomicValue(y));
    else if (t1 is yearMonthDuration type && t2 is yearMonthDuration type)
        return sql_compare_yearMonthDurationType(getAtomicValue(x), getAtomicValue(y));
    else
        raise error}
```

FIG. 5

USING SQL EXTENSIBILITY FOR PROCESSING DYNAMICALLY TYPED XML DATA IN XQUERY QUERIES

RELATED APPLICATIONS

This application is related to U.S. patent application Ser. No. 10/948,523, entitled Efficient Evaluation Of Queries Using Translation, filed by Zhen Hua Liu, et al. on Sep. 22, 2004, the contents of which are herein incorporated herein by reference as if originally set forth herein.

This application is related to U.S. patent application Ser. No. 11/044,472, entitled Techniques of Using XMLType Tree as the Type Infrastructure for XML, filed by Zhen Hua Liu, et al. on Jan. 26, 2005, the contents of which are herein incorporated herein by reference as if originally set forth herein.

FIELD OF THE INVENTION

The present invention relates to processing XQuery queries in a database system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The Extensible Markup Language (XML) is a standard for data and documents that has wide acceptance in the computer industry. Relational and object-relational database systems are configured to store and support query mechanisms for XML data. It is important for such database systems to be able to execute SQL queries that embed XML query languages, such as XQuery.

XQuery and SQL share many common concepts and constructs. This facilitates rewriting XQuery constructs in a query into SQL constructs. Queries rewritten in this way can be executed more efficiently.

However, data typing between SQL and XQuery is not identical. SQL relies on static data typing during query compilation because SQL is based on well-typed structured data whose data type is known during query compilation time. XQuery relies on dynamic typing during run time because XQuery deals with semi or unstructured data whose data type is not known during query compilation time. To illustrate, in SQL, a user issues the following query:

select sum(x) from tab

During query compilation time in a database system, a SQL/XML compiler determines the data type of x based on database metadata defining the column data type of x, and then determines the proper SQL summation operator for the data type. During runtime, the summation operator for that specific data type is invoked and executed to compute the sum.

Likewise, for the following issued XQuery query, sum(fn:doc("tab")/x)

during compile time the data type of element x may be determinable if there is an XML schema available. In this case, the XML schema could, for example, define element x as a simple integer data type, then compiling the XQuery sum( ) operator can use SQL sum( ) operator for the integer type.

However, if the XML schema is NOT available, then the data type can only be determined dynamically, i.e. that is during run time, when the actual data is being accessed. Sometimes, even if the XML schema is available, however, the schema states that the element x can be anyType. In this case, the data type of element x is not known until run time. Therefore, the SQL sum( ) operator cannot be used when compiling the XQuery sum( ) operator over such dynamically typed XML data.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 depicts pseudo-code describing a polymorphic function according to an embodiment of the present invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are approaches that allow XQuery queries that include functions that operate on dynamically typed XML data to be rewritten into compilable SQL constructs. XML data that is dynamically typed is XML data for which a specific XML data type cannot be determined at compile time and in fact may vary. In general, XQuery queries are rewritten into SQL queries that use SQL constructs in lieu of XQuery constructs. The SQL constructs include an "SQL polymorphic function" that is defined or recognized by a database system as valid syntax for an SQL query. The rewritten query applies the XML data to the SQL polymorphic function, but the XML data has been typed as XMLType, a data type recognized by SQL standards.

According to an embodiment, a SQL polymorphic function is a user-defined function that is registered within a database system. This enables the database system to recognize and handle these functions like natively supported functions when the SQL polymorphic functions are present in queries. XQuery queries referencing a particular function defined by the XQuery standard ("XQuery function") are rewritten to reference a SQL polymorphic function corresponding to that particular function. There may be, for example, an SQL polymorphic function for each of the XQuery functions sum( ), min( ), and max( )functions. Providing the capability to replace an XQuery function in a rewritten query with a function recognized by an SQL/XML compiler is referred to herein as extending the XQuery function to SQL.

XMLType is a data type used by a database system to represent XML data of various data types. XMLType is a global data type because it may be any of the specific data types defined by the XQuery Data Model or a combination of these data types. The XQuery Data Model is described in XQuery 1.0 and Xpath2.0 Data Model (XDM), W3C Recommendation, 23 Jan. 2007. Such data types are referred to herein as XML data types. The wide range of data types represented by XMLType include atomic values (e.g. integer, decimal, floating point), a node, an XML subtree, or an XML sequence.

Because XMLType is a global data type that can be one or more specific XML data types, the specific data type(s) of an instance of XMLType cannot be determined until run-time. Typically, an instance is represented by a data representation that includes one or more type identifiers.

A database system supports XMLType as a native built-in data type representing XML data items just as any other native data type, such as VARCHAR, the name of an SQL data type representing variable length character values. Thus, from the point of view of the SQL query compiler of the database system, XML data having the type XMLType is statically typed, even though the underlying data, which is not determined during SQL query compilation time, is dynamically typed.

SQL polymorphic functions, when computed and/or evaluated at run time, can handle a wide range of different specific XML data types that may be encountered, even performing data type conversion as needed. A distinguishing feature of a polymorphic function is that it performs a type checking operation because the function needs to determine what the specific XML data type of a particular data item is. A function that is not polymorphic does not have to perform type checking.

Compiling XQueries to Reference SQL Polymorphic Functions

Figure 1:
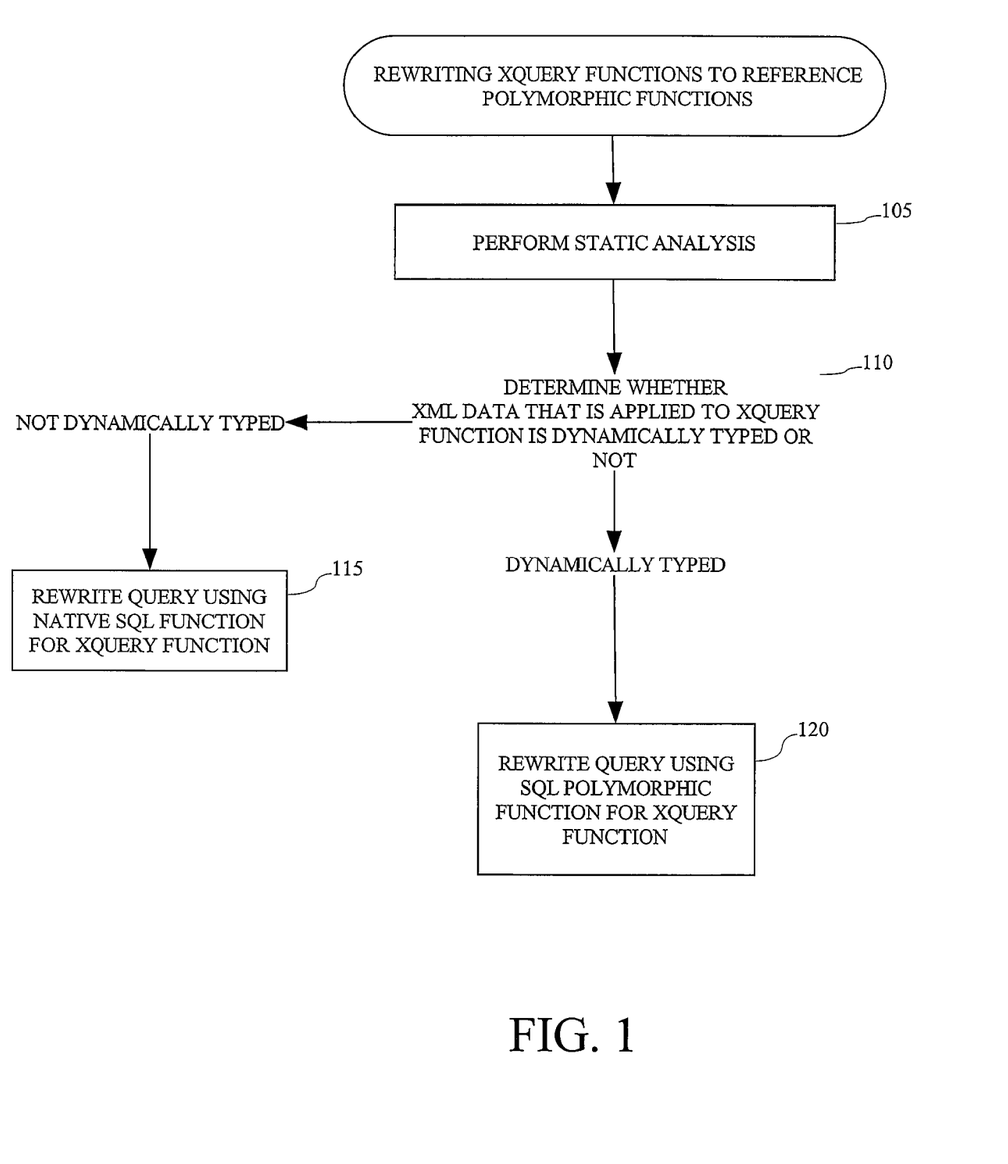
FIG. 1 is a diagram depicting a procedure used for rewriting a query according to an embodiment of the present invention.

FIG. 1 shows an overview of a procedure for compiling a XQuery query to reference a SQL polymorphic functions. The XQuery query references an XQuery function. The procedure is performed by an SQL/XML compiler in a database system that is compiling an Xquery query, one that conforms to XQuery.

Compiling a query, as the term is used herein, refers to the process of determining how to possibly rewrite and/or optimize a query and determining operations, resources, and/or data structures that are required to evaluate the query. A SQL compiler is a compiler that is able to compile statements that conform to a SQL standard. An enhanced SQL compiler with XML processing capability, herein referred to as an SQL/XML compiler, is capable of compiling statements that conform to XML standards, such as XQuery. An XQuery query may be a standalone statement, or may be embedded within a SQL statement.

Note, operations performed during compilation may be referred to as compile-time operations or may be referred to as being performed during compile time. When the query is executed, the operations performed to execute and/or compute the query are referred to as run-time operations or as being performed at run-time or dynamically. An SQL/XML compiler performs compile time operations and is configured to handle syntax that conforms to SQL standards. SQL standards includes SQL/XML, and both ANSI standards and proprietary standards.

The procedure is illustrated using the following XQuery query QP.

sum(fn:doc('/public/Emp.xml')//emp/sal))

Query QP requests the sum of the element //emp/sal within the XML document emp.xml. The XML document Emp.xml is stored in a resource_view table with a resource path of '/public/Emp.xml'.

Referring to FIG. 1, at block 105, static type analysis is performed on the XQuery query, including on the XQuery function sum( ) in the query. Static analysis refers to the procedure of determining whether data items or expressions declared and/or referenced by a query (e.g. column, arguments, expressions, function returns values, XML elements) have a determinable data type and what that data type is. Static analysis may be performed on the query and any forms of the rewritten query, and may be performed in various phases of query compilation.

In the current example, static analysis determines that the XML data that QP applies to the sum( ) function is dynamically typed, that is the data type of the XML data identified by XPath expression string //emp/sal input argument cannot be determined statically during run-time. The term a "query applies data", as used herein, refers to an expression in A query specifying that the data is input for a function or is to be evaluated by a function or operator.

At block 110, a determination is made of whether the data type of the XML data the XQuery query applies to the XQuery function is dynamically typed or not. If the XML data is not dynamically typed and is determinable, then the procedure flows to block 115, where the XQuery query is rewritten using native SQL functions. Native SQL functions are those defined by an SQL standard. If the XML data is dynamically typed, then the execution of the procedure flows to block 120.

At block 120, the XQuery query is rewritten to refer to a SQL polymorphic function. In the current example, QP is rewritten to QP', as follows QP' = SELECT XMLTypeSum(extract(value(v), '//emp/sal'))
  FROM resource_view v
  WHERE EQUALS_PATH(value(v), '/public/EMP.xml') = 1

Note that in QP', each expression can be statically typed by an SQL/XML compiler. The input type of XMLTypeSum is XMLType and the return type of the expression extract ('//emp/sal') is also XMLType. During compile time, an SQL/XML compiler is able deem the data type of these expression as XMLType. In this way, the XML data QP had applied to the XQuery sum( ) function has been typed as XMLType and applied by QP' to polymorphic function XMLTypeSum. However, the underlying specific XML data types of the element values may be any atomic type supported by XMLType, such as decimal and integer, or even other XML data types, such as node, or sequence. In fact, the data type may vary between the element values.

For example, during runtime, when the polymorphic XMLTypeSum is executed for an element value, the function determines the XML data type is decimal. The SQL polymorphic function then adds the value to a variable that holds a decimal value representing the computed sum. For a subsequent element value for the which function is applied, the function determines the value's type is float. The function converts sum in the variable to a float type and stores sum as a float type. For a subsequent element the function determines the type is double The function converts sum in the variable to a double type and stores sum as a double.

Providing SQL Polymorphic Functions

SQL polymorphic functions are user-defined and are not native functions defined by an SQL standard. The SQL/XML compilers of database systems are configured to compile and execute user-defined functions when the functions appear in statements being compiled by the SQL/XML compiler. In order to recognize and otherwise handle a user-defined function, the functions are registered with the database system.

Registering a user-defined function refers to a database system receiving as input the definition of a user-defined function and configuring itself (e.g. generating metadata) to handle the user-defined functions when they appear in database statements compiled by the database system. The definition includes the name of the function, arguments and return type of the function, and implementation (e.g. code) to execute and compute the function. The implementation may have to conform to a format, which may depend on the kind of user-defined being registered. For example, the implementation for an aggregate user-defined function must include an implementation function for initialization, iteration, and termination, as illustrated below.

Figure 2:
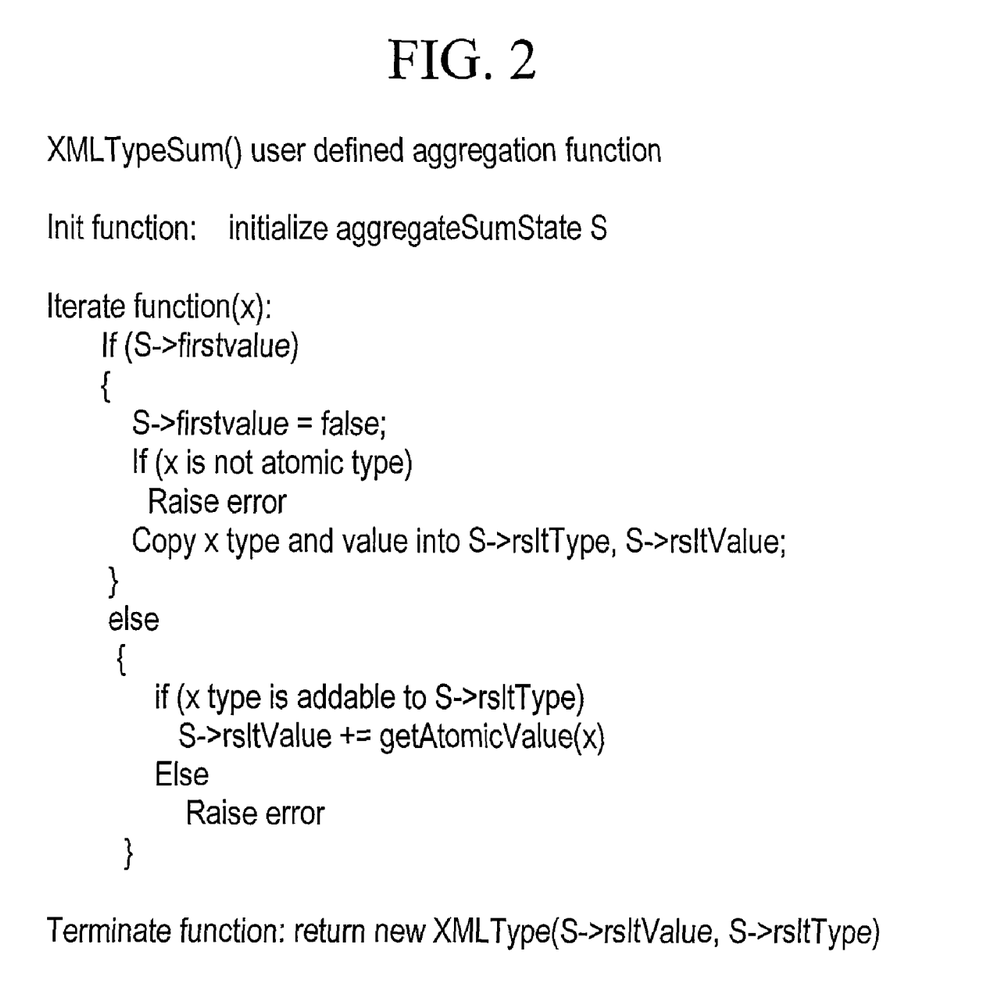
FIG. 2 depicts pseudo-code describing a polymorphic function according to an embodiment of the present invention.
Figure 3:
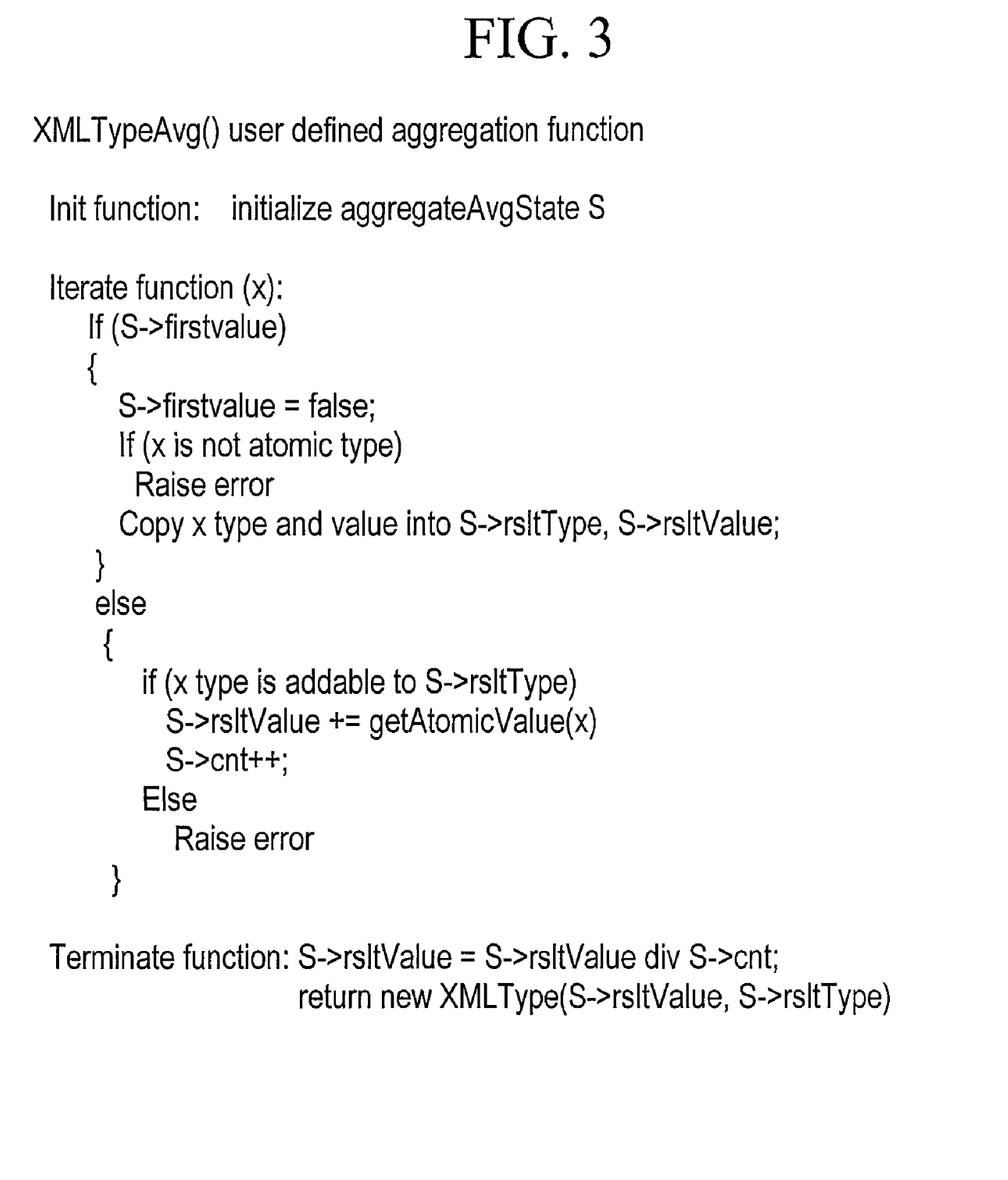
FIG. 3 depicts pseudo-code describing a polymorphic function according to an embodiment of the present invention.

FIG. 2 depicts pseudo-code that describes an implementation for an SQL polymorphic function XMLTypeSum( ) according to an embodiment of the present invention.

Because XMLTypeSum( ) is an aggregate type of function, the implementation includes an initialization function, an iterate function, and a terminate function. The initialize function is called to perform initialization activity, such as initializing the state of variables. The iterate function is called for each input value to apply to XMLTypeSum( ), to accumulate a sum. The terminate function returns the accumulated sum and a count of the number of values is summed. In the Iterate( ) function of XMLTypeSum( ), when a new value for x is passed in, and it is not the first value in an iteration, the function checks to determine whether the data type of x is addable to the result type of the sum so far computed. For example, when Iterate( ) is called the first time, and the data type of the value x passed in is a decimal data type, then S->rsltType is set as decimal type. Then, when Iterator( ) is called the second time, and the data type for the value of x passed in is a string data type, since the string data type is not addable to a decimal data type, a type error is raised. If x, on the other hand, is a float data type, a float data type is addable to the decimal data type, and the addition succeeds.

FIG. 2 also depicts an implementation of the aggregate function XMLTypeAvg, which computes an average. It too includes an init implementation function, an iterate implementation function, and a terminate implementation function. The iterate implementation function is called for each input value to accumulate both sum and count. The terminate function computes and returns an average.

XQuery functions other than aggregate functions that are applied to dynamically typed XML data can be compiled as polymorphic SQL functions. The below table gives examples of such XQuery functions.

XQuery Function Group: examples

Aggregate function: e.g. sum, avg, max, min

Built-in function: e.g. ceiling, round, floor, addition, subtraction, multiplication, division, mod, comparison Constructor function: e.g. xs:date, xs:declimal Cast function: cast as xs:data, cast as xs:decilmal Non-Aggregating SQL Polymorphic Functions Besides the SQL polymorphic functions used for aggregation operations, non-aggregated SQL polymorphic functions are needed as well. For example, a simple XQuery query 'declare $x external; declare $y external; $x<$y' is compiled into XMLTComp( ) SQL polymorphic function because variables $x and $y are dynamically typed. According to an embodiment, a function implementation to perform such a comparison is shown in FIG. 4. It is polymorphic because it handles various XML types encountered during run-time. The function implementation also handles comparison of values having a different XML types.

Examples of uses of a polymorphic SQL function that compares two XMLType values are to process XQuery ORDER BY clause, min( ) or max( ) functions. These depend on a comparison between values to determine which are greater, lesser, or equal in value and/or in order. A function implementation that performs the comparison for the XML data type as illustrated in FIG. 4 can be registered with the database system. When a database system computes a XQuery that requires comparison among dynamically typed XML data, the database system invokes the function implementation to perform the comparison.

Hardware Overview

Figure 5:
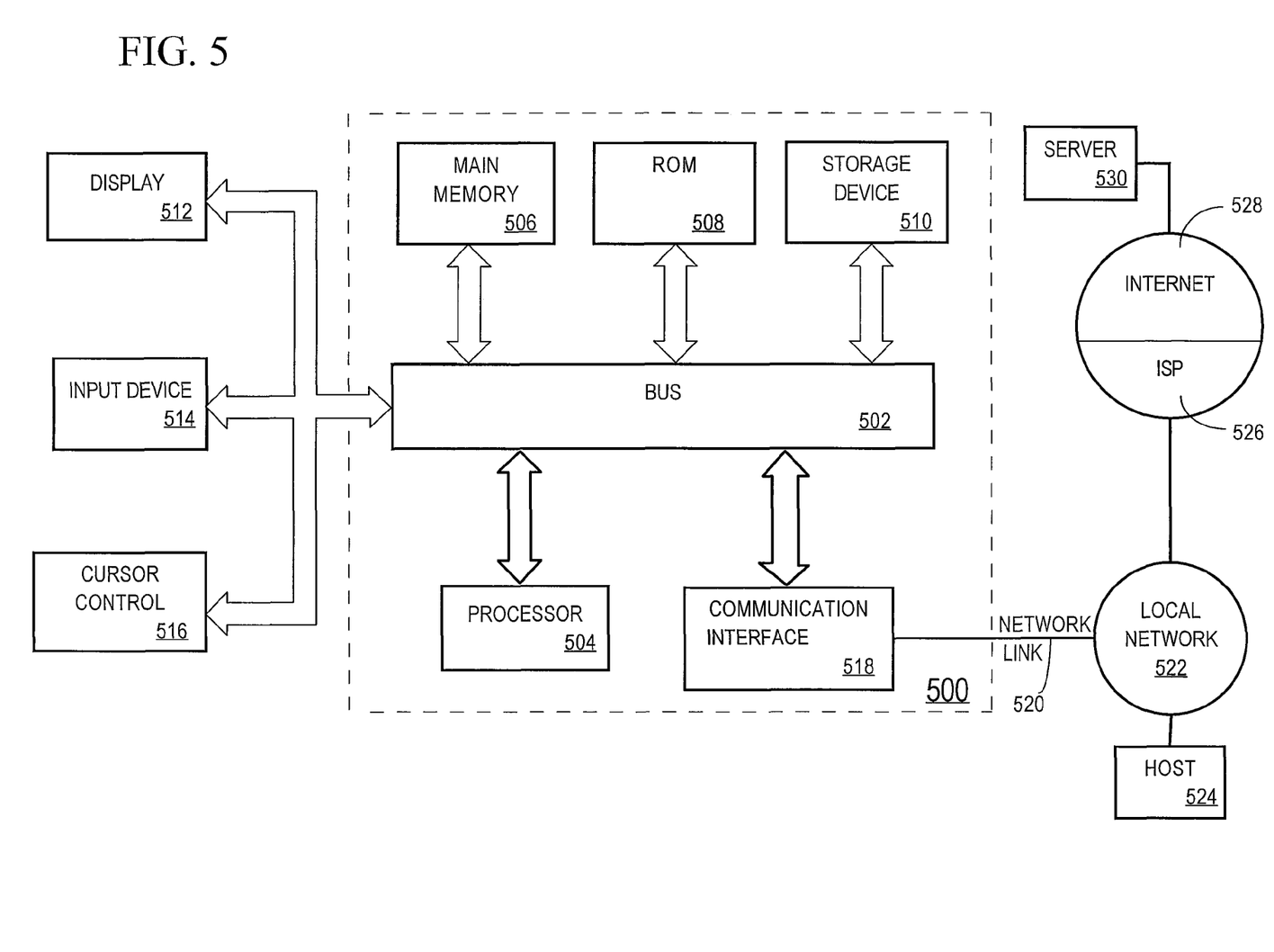
FIG. 5 is a block diagram of a computer-system that may be used in an embodiment of the present invention.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer implemented method comprising:
   a SQL compiler rewriting a certain query that includes a first function to generate a rewritten query, wherein the certain query applies certain data to said first function, wherein rewriting the certain query includes:
      during compile time, said SQL compiler determining that said certain data is dynamically typed; and
   in response to determining that said certain data is dynamically typed, said SQL compiler replacing said first function with a user-defined polymorphic function that is able to handle a range of data types and performs type checking when computed at run time, said rewritten query applying said certain data to said user-defined polymorphic function and typing said certain data as a global data type representing a plurality of specific data types;
   wherein said method is performed by one or more computing devices.

2. A computer implemented method comprising:
   a SQL/XML compiler rewriting a XQuery query that includes a XQuery function to generate a rewritten query, wherein said XQuery query applies XML data to said XQuery function, wherein rewriting said XQuery query includes:
      during compile time, said SQL/XML compiler determining that said XML data is dynamically typed; and
      in response to determining that said XML data is dynamically typed, said SQL/XML compiler replacing said XQuery function with an SQL polymorphic function that is able to handle a range of XML data types and performs type checking when computed at run time, said rewritten query applying said XML data to said SQL polymorphic function and typing said XML data as XMLType, wherein said method is performed by one or more computing devices.

3. The method of claim 2, further including the steps of a database system registering said SQL polymorphic function as a user-defined function.

4. The method of claim 2, wherein said SQL polymorphic function is configured to perform:
type checking, and
one or more operations the execution of which depends on a result of type checking.

5. The method of claim 2, wherein the XQuery function is an XQuery aggregate function.

6. The method of claim 2, wherein the XQuery function is one of:
an XQuery built-in function,
arithmetic function,
comparison function,
an XQuery constructor function, or
an XQuery cast function.

7. The method of claim 2, wherein the XQuery function is an XQuery order-by construct in a FLWOR expression.

8. A computer implemented method comprising:
a SQL/XML compiler rewriting a XQuery query that includes a XQuery function to generate a rewritten query, wherein the XQuery query applies XML data to said XQuery function, wherein rewriting the XQuery query includes:
during compile time, said SQL/XML compiler determining that said XML data is not dynamically typed; and
in response to determining that said XML data is not dynamically typed, said SQL/XML compiler replacing said XQuery function with a native SQL function, said rewritten query applying said XML data to said native SQL function and typing said XML data as XMLType,
wherein said method is performed by one or more computing devices.

9. A computer-readable storage medium that stores instructions which, when executed by one or more processors, cause the one or more processors to perform the steps of:
a SQL compiler rewriting a certain query that includes a first function to generate a rewritten query, wherein the certain query applies certain data to said first function, wherein rewriting the certain query includes:
during compile time, said SQL compiler determining that said certain data is dynamically typed; and
in response to determining that said certain data is dynamically typed, said SQL compiler replacing said first function with a user-defined polymorphic function that is able to handle a range of data types and performs type checking when computed at run time, said rewritten query applying said certain data to said user-defined polymorphic function and typing said certain data as a global data type representing a plurality of specific data types.

10. A computer-readable storage medium that stores instructions which, when executed by one or more processors, cause the one or more processors to perform the steps of:
a SQL/XML compiler rewriting a XQuery query that includes a XQuery function to generate a rewritten query, wherein said XQuery query applies XML data to said XQuery function, wherein rewriting said XQuery query includes:
during compile time, said SQL/XML compiler determining that said XML data is dynamically typed; and
in response to determining that said XML data is dynamically typed, said SQL/XML compiler replacing said XQuery function with an SQL polymorphic function that is able to handle a range of XML data types and performs type checking when computed at run time, said rewritten query applying said XML data to said SQL polymorphic function and typing said XML data as XMLType.

11. The computer-readable storage medium of claim 10, further comprising instructions for a database system registering said SQL polymorphic function as a user-defined function.

12. The computer-readable storage medium of claim 10, wherein said SQL polymorphic function is configured to perform:
type checking, and
one or more operations the execution of which depends on a result of type checking.

13. The computer-readable storage medium of claim 10, wherein the XQuery function is an XQuery aggregate function.

14. The computer-readable storage medium of claim 10, wherein the XQuery function is one of:
an XQuery built-in function,
arithmetic function,
comparison function,
an XQuery constructor function, or
an XQuery cast function.

15. The computer-readable storage medium of claim 10, wherein the XQuery function is an XQuery order-by construct in a FLWOR expression.

16. A computer-readable storage medium that stores instructions which, when executed by one or more processors, cause the one or more processors to perform the steps of:
a SQL/XML compiler rewriting a XQuery query that includes a XQuery function to generate a rewritten query, wherein the XQuery query applies XML data to said XQuery function, wherein rewriting the XQuery query includes:
during compile time, said SQL/XML compiler determining that said XML data is not dynamically typed; and
in response to determining that said XML data is not dynamically typed, said SQL/XML compiler replacing said XQuery function with a native SQL function, said rewritten query applying said XML data to said native SQL function and typing said XML data as XMLType.

\* \* \* \* \*